US012325379B2

(12) United States Patent
Cho et al.

(10) Patent No.: US 12,325,379 B2
(45) Date of Patent: Jun. 10, 2025

(54) DIRECTION CHANGEABLE SEAT WITH MOVABLE SEATBELT FIXING POSITION FOR VEHICLE

(71) Applicant: Hyundai Transys Incorporated, Seosan-si (KR)

(72) Inventors: Young Deok Cho, Hwaseong-si (KR); Jae Woo Kim, Hwaseong-si (KR)

(73) Assignee: Hyundai Transys Incorporated, Seosan-si (KR)

( * ) Notice: Subject to any disclaimer, the term of this patent is extended or adjusted under 35 U.S.C. 154(b) by 232 days.

(21) Appl. No.: 18/346,922

(22) Filed: Jul. 5, 2023

(65) Prior Publication Data

US 2024/0034268 A1    Feb. 1, 2024

(30) Foreign Application Priority Data

Jul. 28, 2022   (KR) .................. 10-2022-0094095

(51) Int. Cl.
| | |
|---|---|
| *B60N 2/02* | (2006.01) |
| *B60N 2/14* | (2006.01) |
| *B60N 2/20* | (2006.01) |
| *B60N 2/806* | (2018.01) |
| *B60N 2/90* | (2018.01) |
| *B60Q 3/70* | (2017.01) |

(Continued)

(52) U.S. Cl.
CPC .............. *B60R 22/26* (2013.01); *B60N 2/143* (2013.01); *B60N 2/806* (2018.02); *B60N 2/995* (2018.02); *B60R 22/34* (2013.01); *B60R 2022/1806* (2013.01); *B60R 2022/1831* (2013.01)

(58) Field of Classification Search
CPC ............ B60R 22/26; B60R 2022/1806; B60R 2021/23386; B60N 2/203; B60N 2/688
USPC ................................................ 297/72, 92, 94
See application file for complete search history.

(56) References Cited

U.S. PATENT DOCUMENTS

| | | | |
|---|---|---|---|
| 3,964,785 A | 6/1976 | Plume | |
| 6,957,853 B2* | 10/2005 | Williams | ............... B60N 2/203 297/94 |

(Continued)

FOREIGN PATENT DOCUMENTS

| | | |
|---|---|---|
| JP | 2012-056380 A | 3/2012 |
| JP | 2018-127180 A | 8/2018 |
| KR | 10-2020-0023098 A | 3/2020 |

*Primary Examiner* — Shin H Kim
(74) *Attorney, Agent, or Firm* — Bridgeway IP Law Group, PLLC; Jihun Kim

(57) ABSTRACT

Disclosed is a vehicle seat including a first seat portion serving as a seatback or a seat cushion according to rotation thereof, a second seat portion connected to the first seat portion and serving as a seatback or a seat cushion according to rotation thereof, a rotation shaft allowing the direction change of the seat when the first seat portion and the second seat portion rotate by connecting the first seat portion and the second seat portion and providing a rotation center for the first seat portion and the second seat portion, a first fixing device and a second fixing device respectively provided in the first seat portion and the second seat portion, and a seatbelt including a webbing and a coupling device connected to the webbing and allowing the passenger to be restrained from both front and rear directions of the seat by engaging the coupling device with the first fixing device or the second fixing device according to the direction change of the seat.

16 Claims, 12 Drawing Sheets

(51) Int. Cl.
  *B60R 22/18*  (2006.01)
  *B60R 22/26*  (2006.01)
  *B60R 22/34*  (2006.01)

(56) References Cited

U.S. PATENT DOCUMENTS

| | | | |
|---|---|---|---|
| 7,156,442 B2* | 1/2007 | McManus | B60N 2/933 |
| | | | 296/65.09 |
| 7,726,730 B2* | 6/2010 | Peter | B60N 2/072 |
| | | | 297/483 |
| 10,479,233 B2* | 11/2019 | Minato | B60N 2/203 |
| 10,933,774 B2* | 3/2021 | Curts | B63B 29/04 |
| 11,590,861 B2* | 2/2023 | Tanabe | B60N 2/06 |
| 11,673,529 B2* | 6/2023 | Hammadi | B60N 2/4221 |
| | | | 297/468 |
| 11,851,023 B2* | 12/2023 | Kim | B60R 22/26 |
| 12,240,411 B1* | 3/2025 | Lee | B60R 25/0221 |
| 12,258,100 B1* | 3/2025 | De Luca | B63B 29/04 |
| 12,263,806 B2* | 4/2025 | Ohno | B60R 22/195 |
| 12,269,410 B2* | 4/2025 | Lesartre | B60R 21/23138 |
| 2004/0256894 A1 | 12/2004 | McManus et al. | |
| 2005/0253433 A1* | 11/2005 | Brown | B60N 2/233 |
| | | | 297/283.3 |
| 2009/0277372 A1* | 11/2009 | Wood | B63B 29/04 |
| | | | 297/94 |
| 2015/0258955 A1* | 9/2015 | Jayasuriya | B60N 2/22 |
| | | | 297/353 |
| 2019/0118681 A1* | 4/2019 | Daniel | B60N 2/20 |
| 2020/0062149 A1* | 2/2020 | Sekizuka | B60R 22/26 |
| 2020/0122611 A1* | 4/2020 | Sekizuka | B60R 22/26 |
| 2020/0331427 A1* | 10/2020 | Abro | B60R 22/02 |
| 2021/0155194 A1* | 5/2021 | Goswami | B60R 21/207 |
| 2021/0380067 A1* | 12/2021 | Hammadi | B60N 2/688 |
| 2025/0026296 A1* | 1/2025 | Lesartre | B60N 2/688 |
| 2025/0058737 A1* | 2/2025 | Jaradi | B60R 22/201 |

* cited by examiner

DIRECTION CHANGEABLE SEAT WITH MOVABLE SEATBELT FIXING POSITION FOR VEHICLE

CROSS REFERENCE TO RELATED APPLICATION

The present application claims priority to Korean Patent Application No. 10-2022-0094095, filed on Jul. 28, 2022, the entire contents of which is incorporated herein for all purposes by this reference.

TECHNICAL FIELD

The present disclosure relates to a vehicle seat that allows restraint of passengers from both directions of the seat by moving the fixing point of a seatbelt according to the direction change of the seat.

BACKGROUND

A vehicle is provided with a seat for a driver or passenger to sit on. In particular, the seat includes a seat cushion for the passenger to sit on and a seatback for the passenger to lean their back on.

The seat is provided with a seatbelt to prevent injury to the passenger in the event of a collision with an external object. The seatbelt protects the passenger from a collision by restraining a part of the passenger's body in the event the vehicle collides with an external object.

A typical seatbelt is formed such that a retractor is fixed to the vehicle floor or frame through an anchor and supplied through or along the frame. Fixing the seatbelt to the vehicle body or seat allows the protection of passengers seated only in a designated direction.

Studies on autonomous driving of vehicles have been widely conducted in recent years, and as a result, the interior space of vehicles has expanded, and the movement of the seat is becoming more diverse than before. The diverse movement of the seat changes the seating conditions for the passengers. However, the problem is that fixing the seatbelt to the vehicle body fixes the position of the seatbelt, thereby making it impossible to protect passengers in diverse seating conditions.

The matters described above as background technology are intended to provide a better understanding of the background of the present disclosure and should not be considered as acknowledging that the present disclosure pertains to the prior art already known to those skilled in the art.

SUMMARY

The present disclosure is proposed to solve the issues described above and is intended to provide a vehicle seat that allows the passengers to be restrained from both directions of the seat by moving the fixing position of the seatbelt according to the direction change of the seat.

A vehicle seat depending on the present disclosure for achieving the object described above includes a first seat portion serving as a seatback or a seat cushion depending on a rotational position of the first seat portion, a second seat portion connected to the first seat portion and serving as a seatback or a seat cushion depending on a rotational position of the second seat portion, a rotation shaft allowing direction change of the seat when the first seat portion and the second seat portion rotate by connecting the first seat portion and the second seat portion and providing a rotation center for the first seat portion and the second seat portion, a first fixing device and a second fixing device respectively provided in the first seat portion and the second seat portion, and a seatbelt including a webbing and a coupling device connected to the webbing and allowing a passenger to be restrained from both front and rear directions of the seat by engaging the coupling device with the first fixing device or the second fixing device according to the direction change of the seat.

The first fixing device and the second fixing device may be provided on t rear surfaces of the first seat portion and the second seat portion respectively and may be provided on the ends of the first seat and second seat portions opposite to a position of the rotation shaft.

A main buckle tongue provided to be movable along the webbing, a main buckle provided on one side of the seat and coupled to the main buckle tongue, and a retractor that is provided on the other side of the seat and on which the webbing is wound may be further included.

The main buckle may be provided on one side of the seat and the retractor may be provided on the other side of the seat respectively to be movable according to the direction change of the seat.

The first fixing device and the second fixing device may be provided on the rear surfaces of the first seat portion and the second seat portion, on the side on which the retractor is positioned and may be provided at the ends opposite the rotation shaft position.

A first rest portion and a second rest portion respectively provided with fixing bars and respectively connected to the first seat portion and the second seat portion through the fixing bars may be further included, and connection portions coupled to the fixing bars of the first rest portion and the second rest portion to allow extension and rotation of the fixing bars may be provided on the rear surfaces of the first seat portion and the second seat portion respectively.

The first rest portion and the second rest portion may respectively serve as a headrest or a leg rest according to the direction change of the seat.

A first fixing device and a second fixing device may be provided on the rear surface of the first seat portion and the second seat portion respectively and may be provided between the side ends of the first seat portion and the second seat portion and the connection portions connected to the first rest portion and the second rest portion.

The webbing may pass between the first seat portion and the first rest portion or between the second seat portion and the second rest portion, and a coupling device provided in the webbing may engage with the first fixing device or the second fixing device provided on the rear surfaces of the first seat portion and the second seat portion.

The first and second fixing devices provided in the first seat portion and the second seat portion respectively may be auxiliary buckles.

The coupling device connected to the webbing may be an auxiliary buckle tongue engageable with the auxiliary buckle.

A case in which the retractor is housed and a space for the retractor rotation is formed may be further included.

A cover may be coupled to the top of the case, and a slit may be formed in the cover so that the webbing extending from the retractor may be guided along the slit when the retractor rotates.

The slit of the cover may be provided with a webbing guide, the webbing guide may slide in the slit, and the webbing extending from the retractor may pass through the webbing guide.

A storage recess for storing the main buckle tongue may be formed in the cover.

The main buckle tongue may be inserted and stored in the storage recess of the cover when the main buckle tongue of the seatbelt is detached from the main buckle.

According to the vehicle seat of the present disclosure, by positioning the seatbelt so that the passenger may be restrained from both directions of the seat according to the direction change of the seat around the rotation shaft, there is an effect of securing the same restraining force and safety even when the direction of the seat and the seating condition of the passenger change.

DETAILED DESCRIPTION

Figure 1:
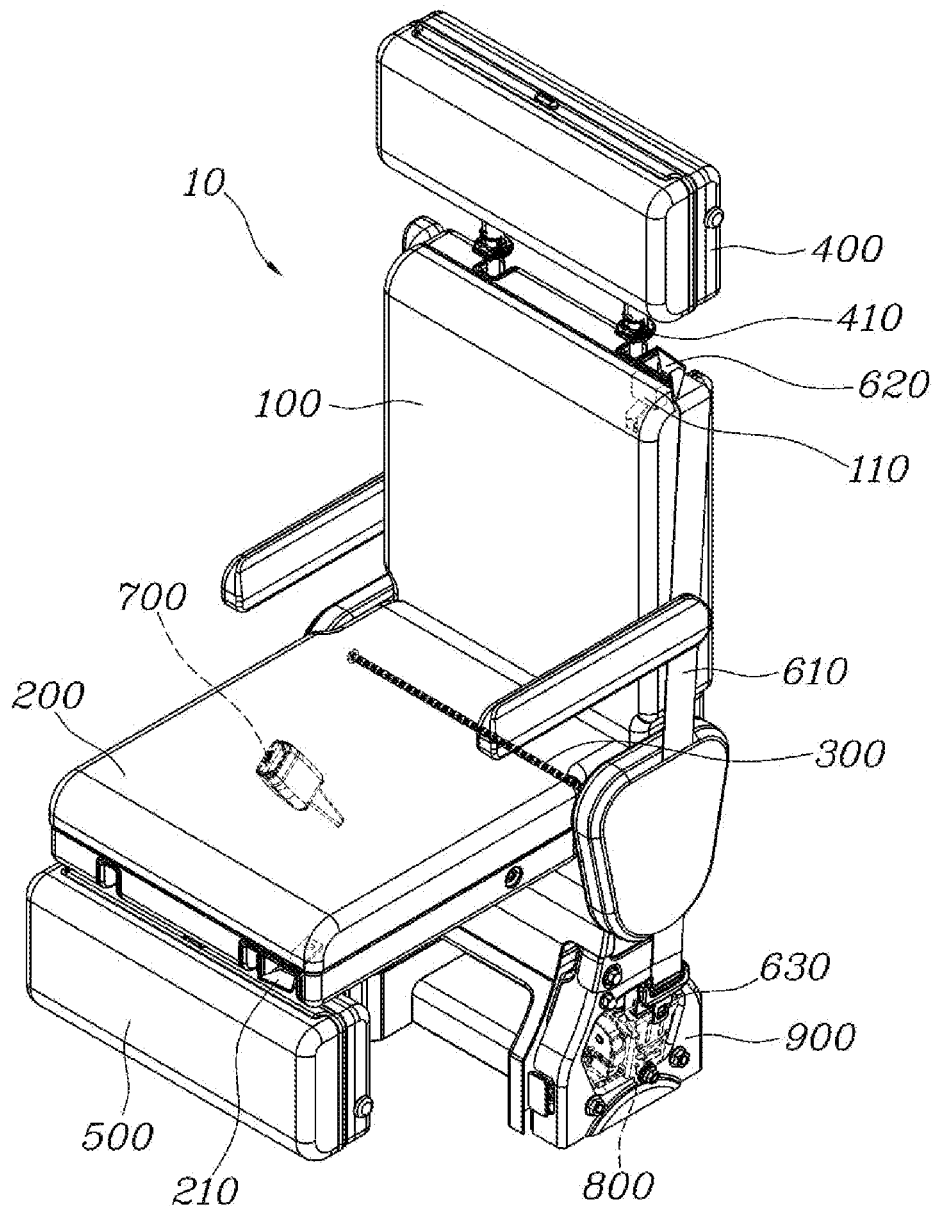
FIGS. 1 and 2 are perspective views of a vehicle seat according to an embodiment of the present disclosure.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Embodiments disclosed herein will be described in detail with reference to the accompanying drawings. The same or similar components will be given the same reference numerals regardless of drawing numbers and repetitive descriptions thereof will be omitted.

Figure 2:
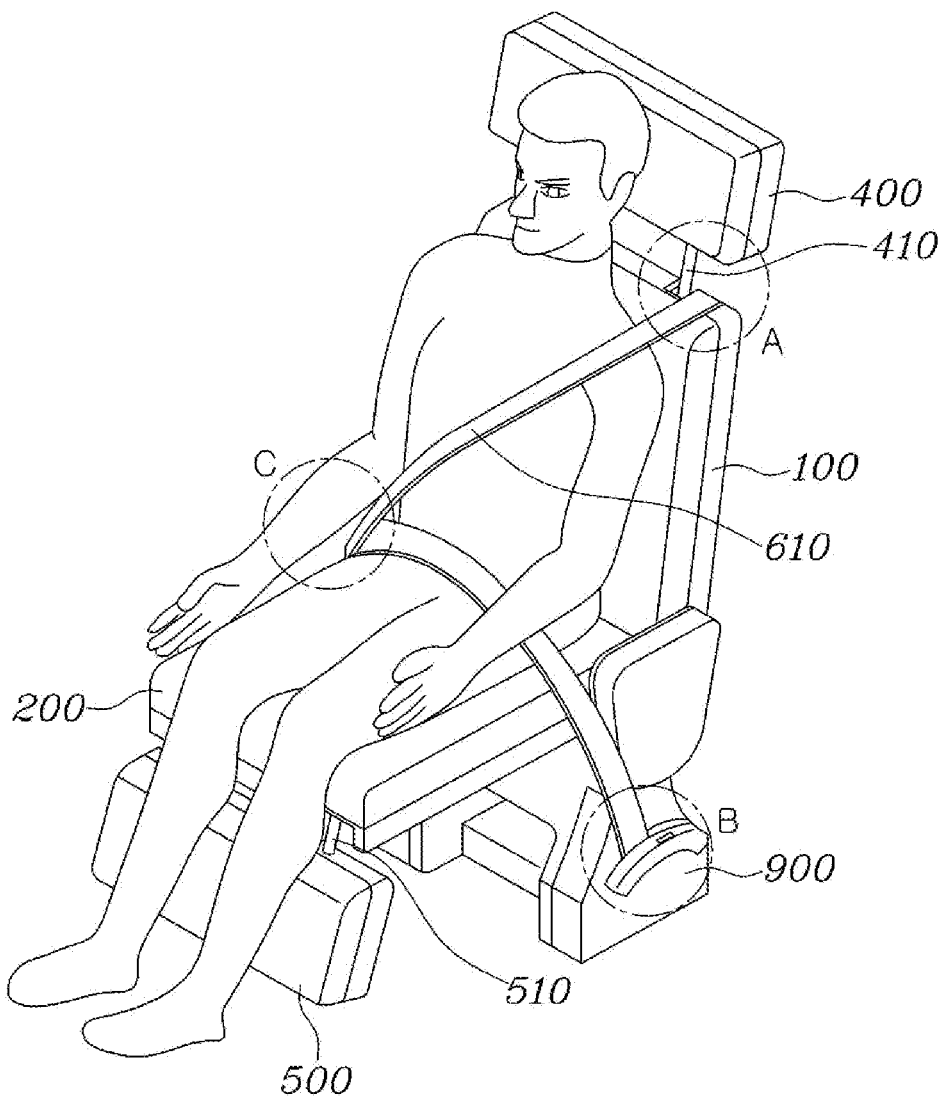
Figure 3A:
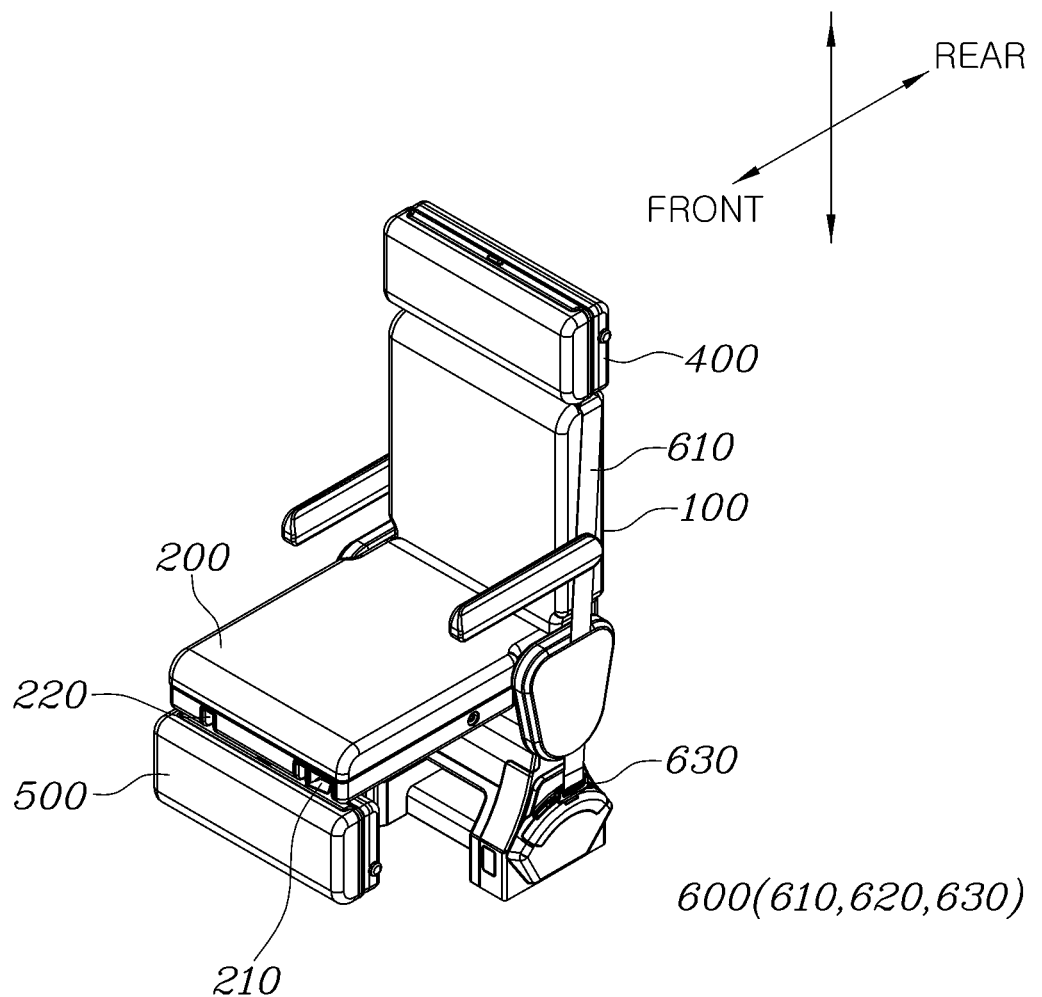
FIGS. 3A and 3B are a perspective view of a process of performing direction change of a vehicle seat according to an embodiment of the present disclosure.
Figure 3B:
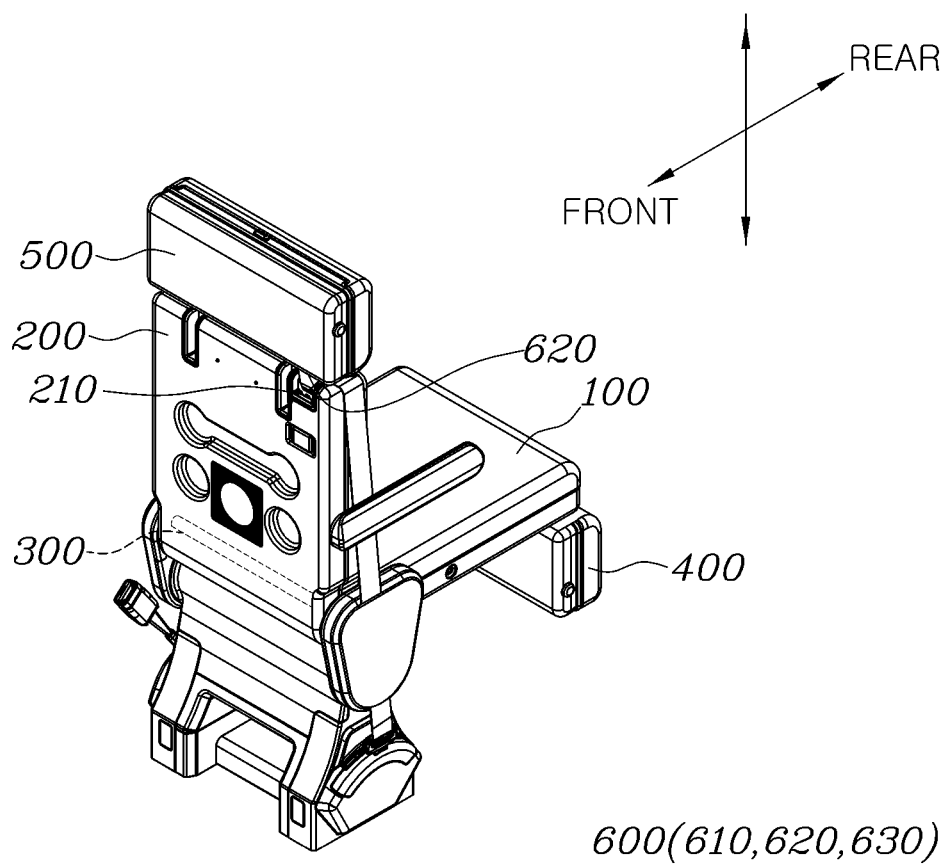
Figure 4:
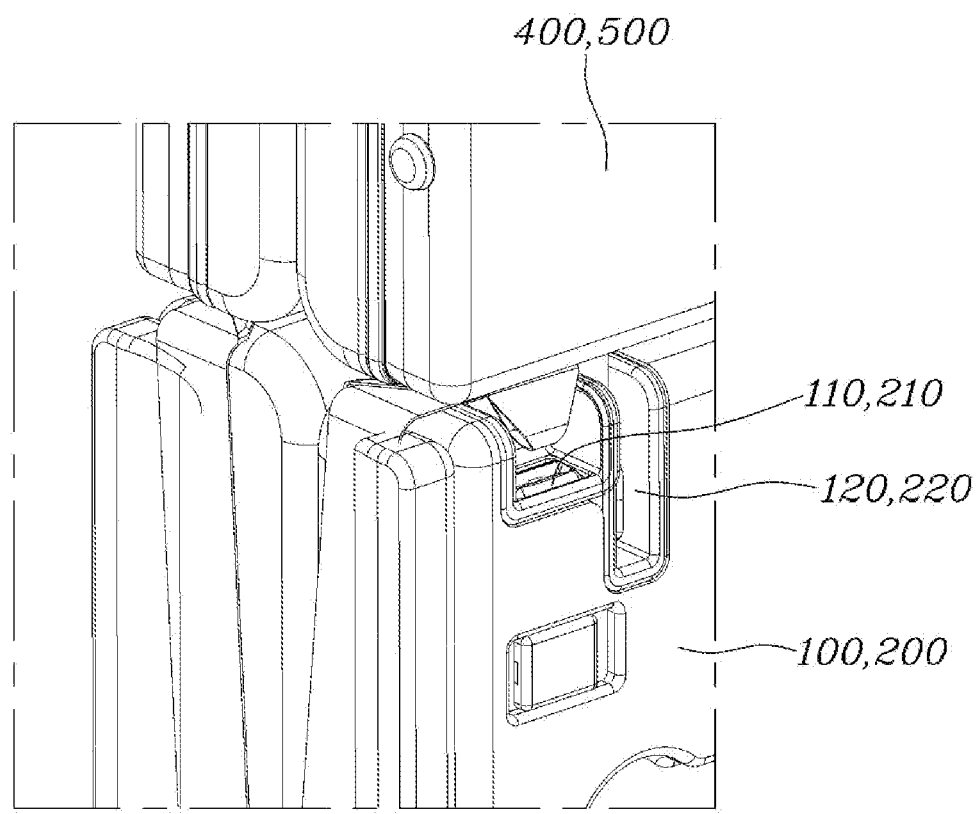
FIG. 4 is a perspective view of a first fixing device or a second fixing device formed in a first seat portion or a second seat portion according to an embodiment of the present disclosure.
Figure 5:
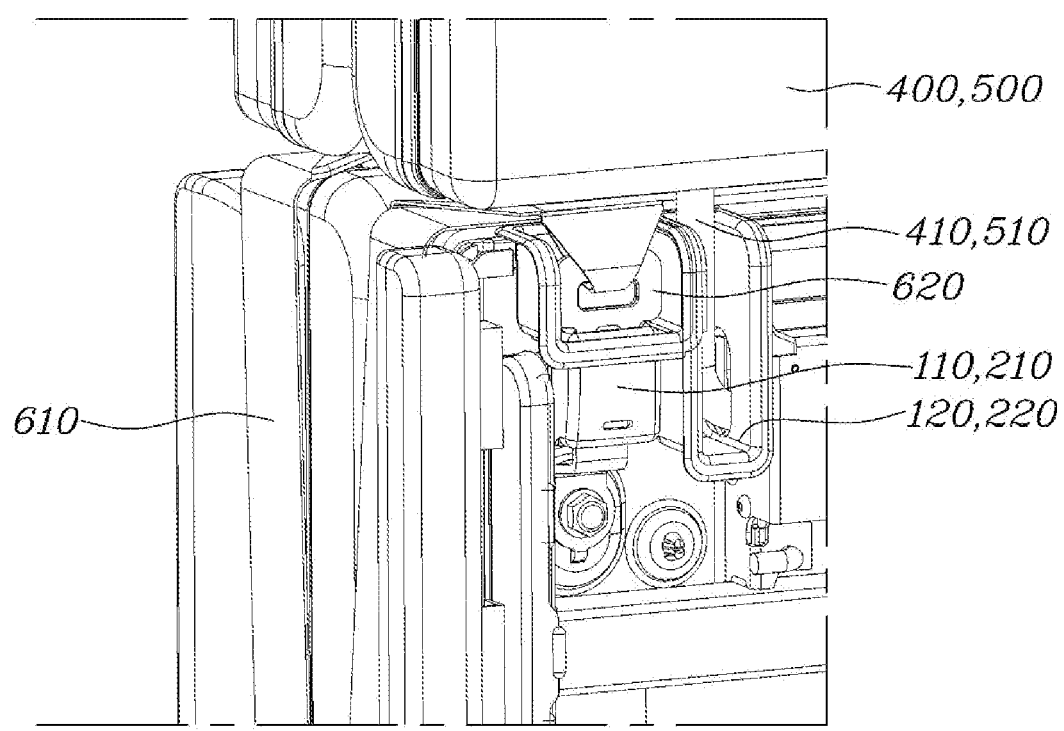
FIG. 5 is a perspective view of a coupling device in an engaging state with the first fixing device or a second fixing device according to an embodiment of the present disclosure.
Figure 6:
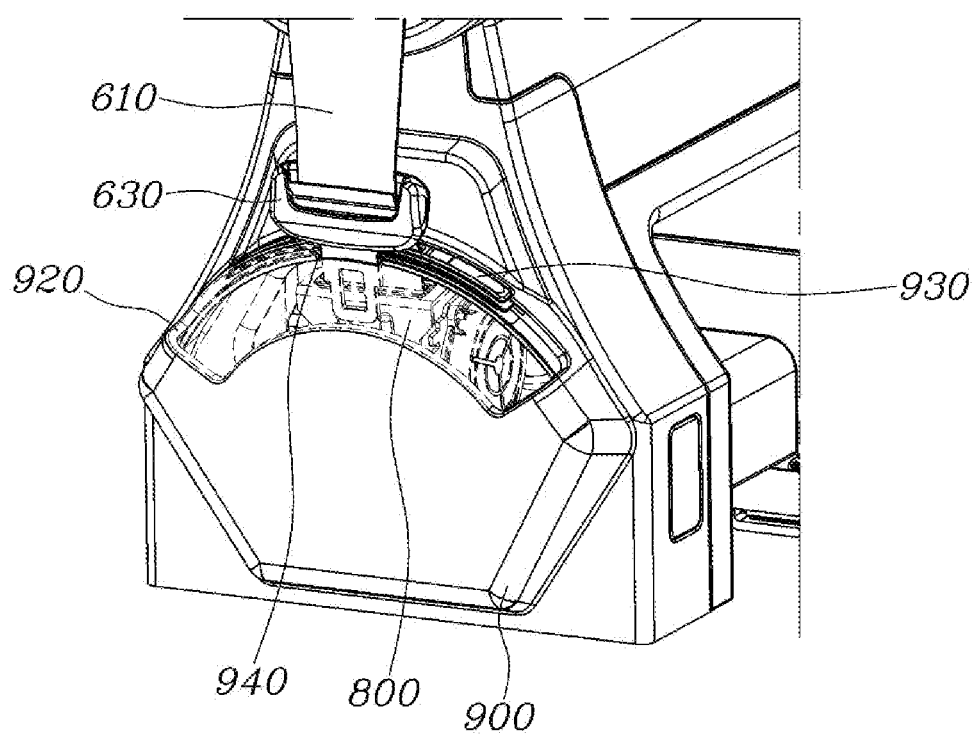
FIG. 6 is an enlarged perspective view of a side of a vehicle seat provided with a retractor according to an embodiment of the present disclosure.
Figure 7:
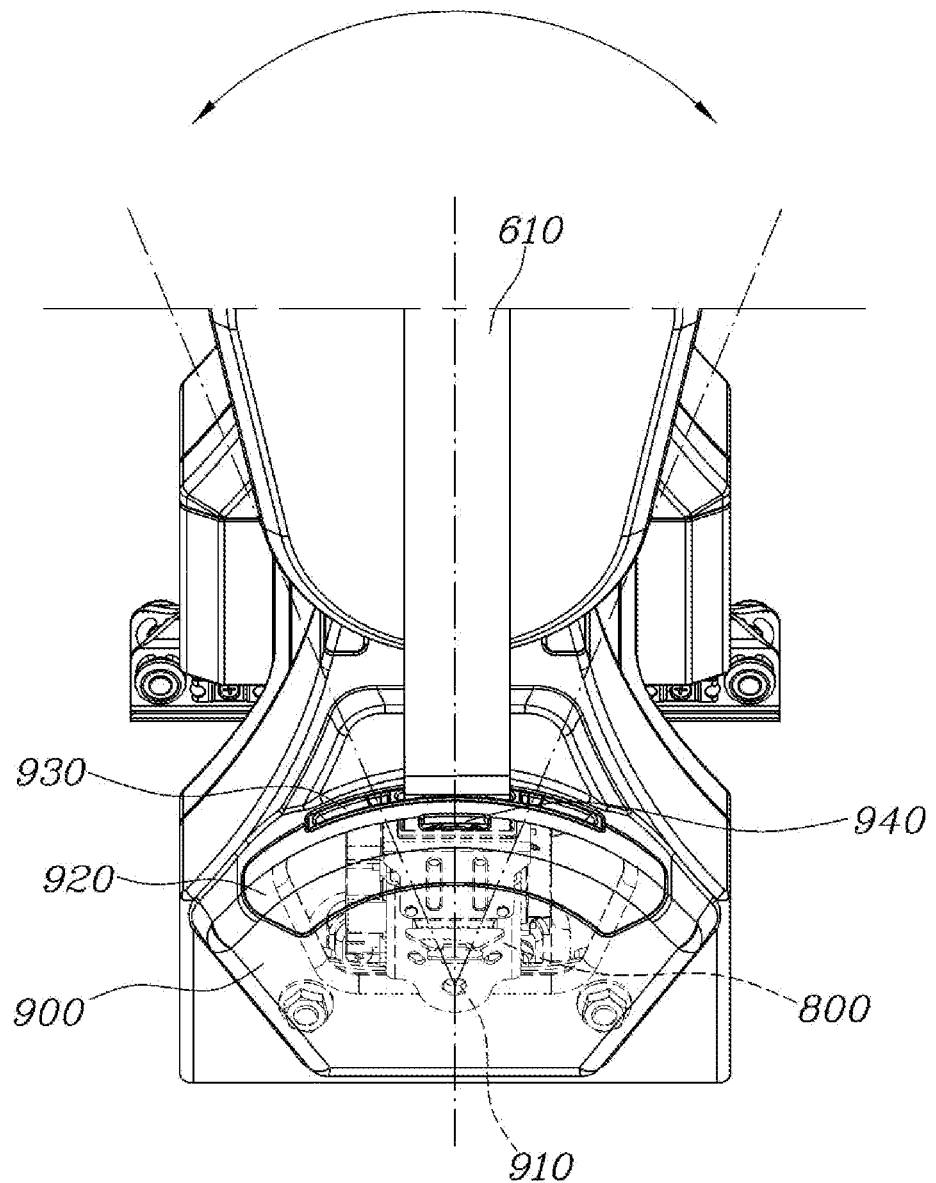
FIG. 7 is a longitudinal view showing the rotation of a retractor provided on a side of a vehicle seat according to an embodiment of the present disclosure.
Figure 8:
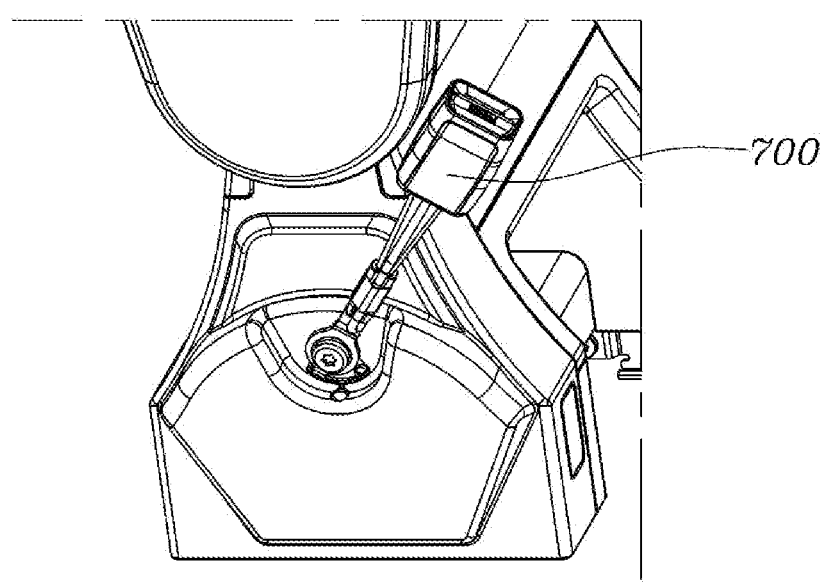
FIG. 8 is an enlarged perspective view of a side of a vehicle seat provided with a main buckle according to an embodiment of the present disclosure.
Figure 9:
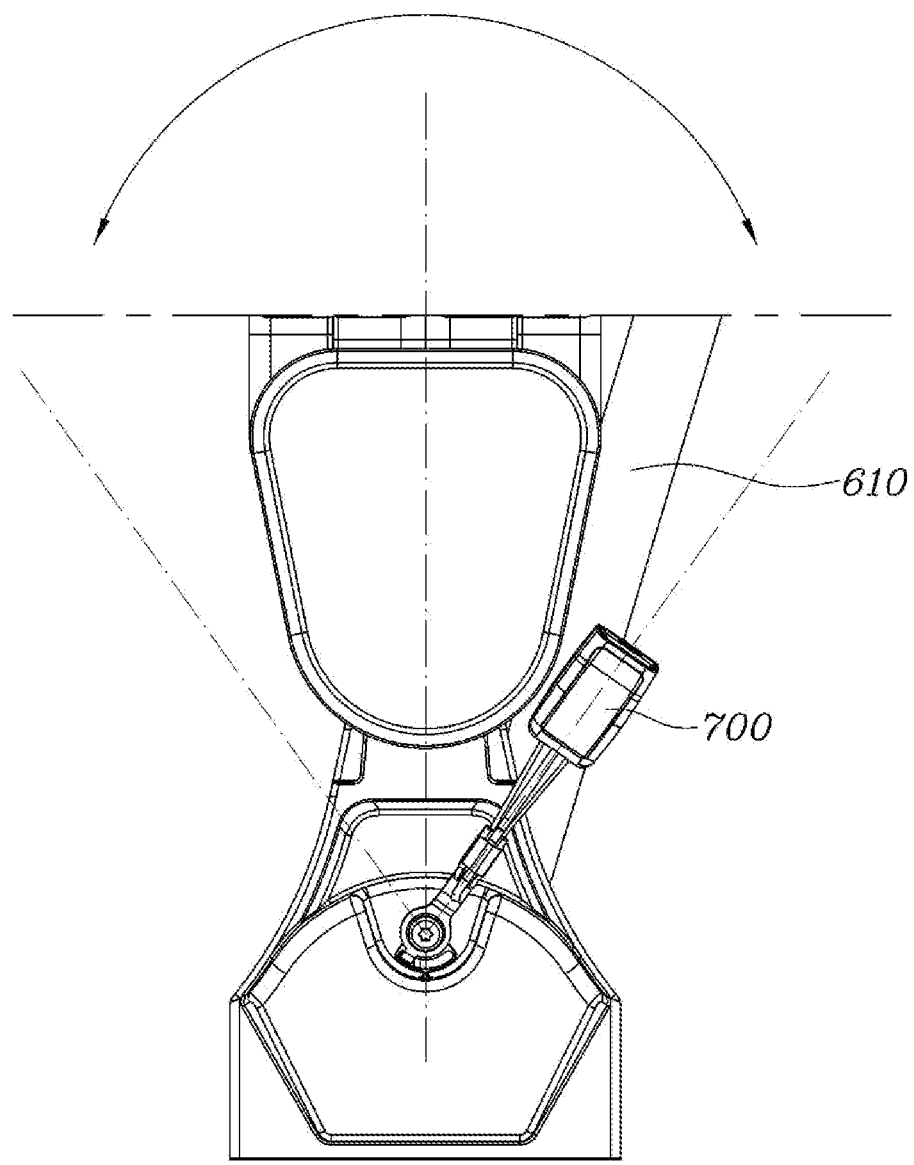
FIG. 9 is a longitudinal view showing the rotation of a main buckle provided on a side of a vehicle seat according to an embodiment of the present disclosure.
Figure 10:
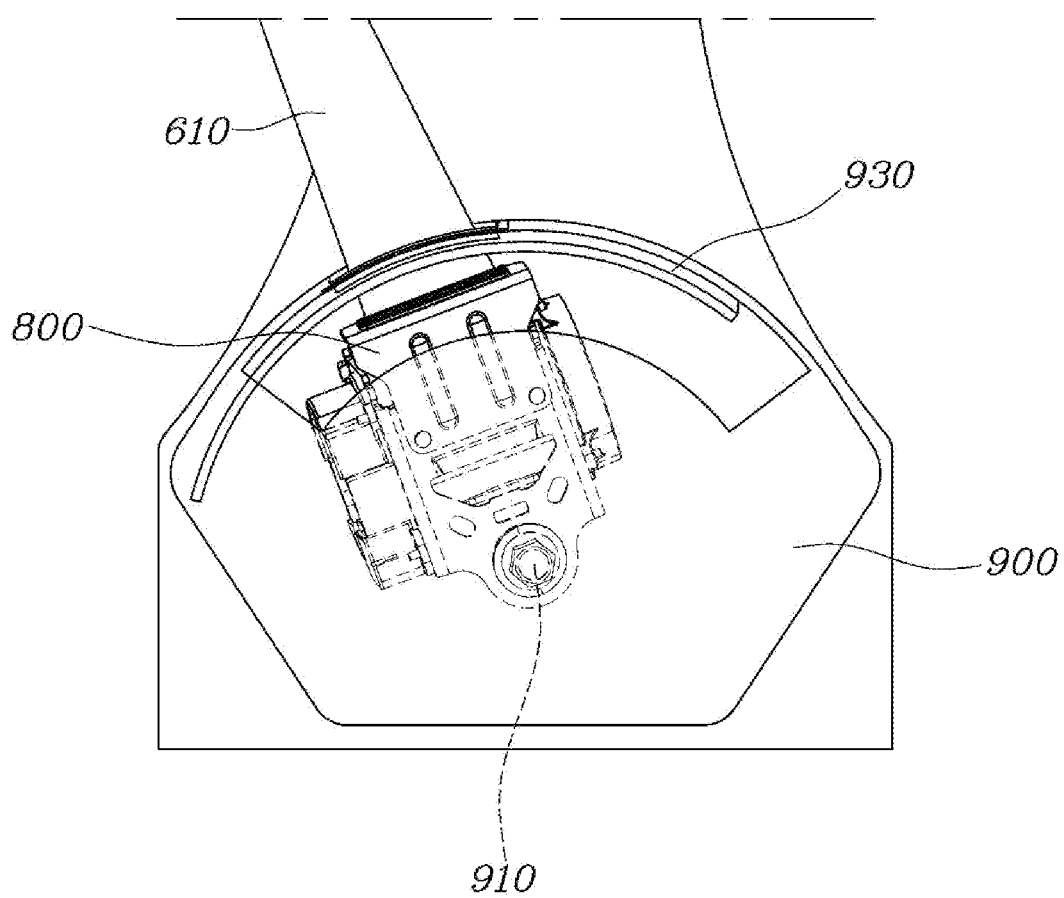
FIGS. 10 and 11 are plan views of a retractor case provided on the side of a vehicle seat according to an embodiment of the present disclosure.
Figure 11:
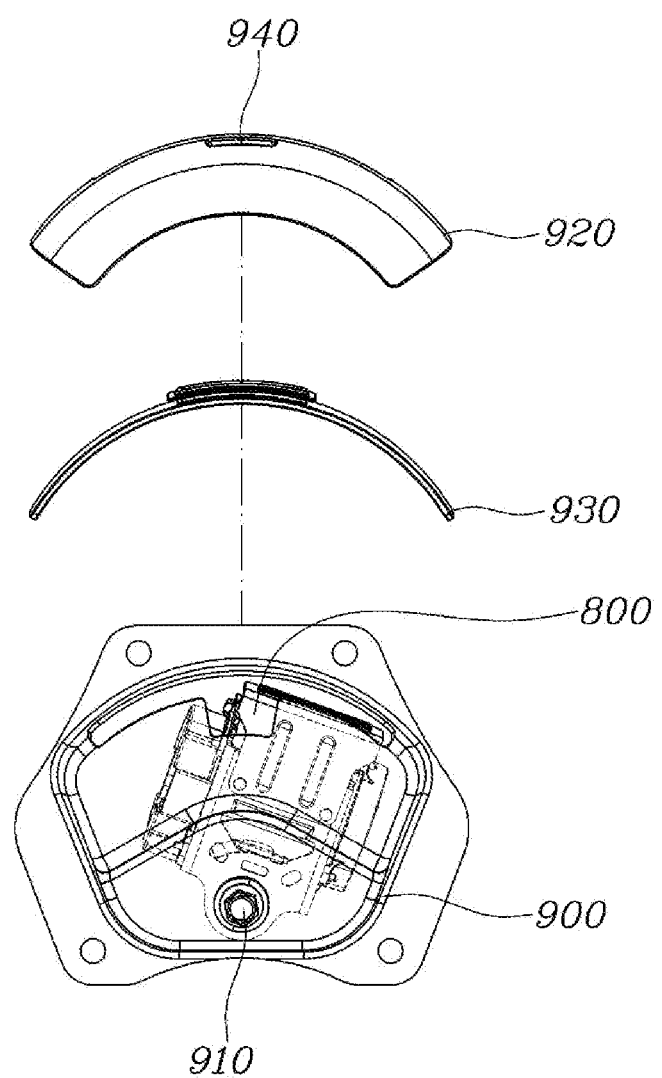

FIGS. 1 and 2 are perspective views of a vehicle seat according to an embodiment of the present disclosure, FIGS. 3A and 3B are a perspective view of a process of performing direction change of a vehicle seat according to an embodiment of the present disclosure, FIG. 4 is a perspective view of a first fixing device or a second fixing device formed in a first seat portion or a second seat portion according to an embodiment of the present disclosure, and FIG. 5 is a perspective view of a coupling device engaging with the first fixing device or a second fixing device according to an embodiment of the present disclosure. FIG. 6 is an enlarged perspective view of a side of a vehicle seat provided with a retractor according to an embodiment of the present disclosure, FIG. 7 is a longitudinal view showing the rotation of a retractor provided on the side of a vehicle seat according to an embodiment of the present disclosure, FIG. 8 is an enlarged perspective view of a side of a vehicle seat provided with a main buckle according to an embodiment of the present disclosure, FIG. 9 is a longitudinal view showing the rotation of a main buckle provided on the side of a vehicle seat according to an embodiment of the present disclosure, and FIGS. 10 and 11 are plan views of a retractor case provided on the side of a vehicle seat according to an embodiment of the present disclosure.

FIGS. 1 and 2 are perspective views of a vehicle seat according to an embodiment of the present disclosure. According to the present disclosure, a vehicle seat 10 includes a first seat portion 100 serving as a seatback or a seat cushion depending on rotation, a second seat portion 200 connected to the first seat portion 100 and serving as a seatback or a seat cushion depending on rotation, a rotation shaft 300 allowing the direction change of the seat 10 when the first seat portion 100 and the second seat portion 200 rotate by connecting the first seat portion 100 and the second seat portion 200 and providing a rotation center for the first seat portion 100 and the second seat portion 200, a first fixing device 110 and a second fixing device 210 respectively provided in the first seat portion 100 and the second seat portion 200, and a seatbelt 600 including a webbing 610 and a coupling device 620 provided in the webbing 610 and allowing passengers to be restrained from both directions of the seat 10 by the coupling device 620 engaging with the first fixing device 110 or the second fixing device 210 according to the direction change of the seat.

A typical seatbelt 600 is formed such that a retractor 800 is fixed to the vehicle floor or seat frame through an anchor 910 and supplied through a vehicle frame. The fixing of the conventional seatbelt 600 to the vehicle body or a seat 10 allowed the protection of passengers seated only in a designated direction. Studies on autonomous driving of vehicles have been widely conducted in recent years, and as a result, the interior space of vehicles has expanded and the movement of the seat 10 is becoming more diverse than before. In particular, as the movement and rotation of the seat 10 become more diverse, it is necessary to change the position of the seatbelt 600 to protect the passengers safely. Thus, the vehicle seat 10 of the present disclosure is intended to provide the same safety as before to passengers having various seating conditions by moving the fixing point of the seatbelt 60 according to the direction change of the seat. An embodiment of a vehicle seat 10 undergoing the direction change in the front-to-rear direction of the vehicle will be described in the following.

First, FIGS. 3A and 3B are a perspective view of the process of performing direction change of a vehicle seat according to an embodiment of the present disclosure. The vehicle seat 10 includes a rotation shaft 300 connecting the first seat portion 100 and the second seat portion 200 while simultaneously allowing the direction change of the seat 10. Since the first seat portion 100 and the second seat portion 200 are connected to the rotation shaft, the first seat portion 100 and the second seat portion 200 can freely rotate around the rotation shaft. In particular, in the vehicle seat 10 of the present disclosure, the direction change of the first seat portion 100 and the second seat portion 200 in the front-to-rear direction of the vehicle is performed by the rotation shaft 300. The vehicle seat 10 faces the rear of the vehicle when the direction change of the first seat portion 100 and the second seat portion 200 is performed. FIG. 1 shows that the first seat portion 100 may serve as a seatback when the vehicle seat 10 of the present disclosure faces the front of the vehicle. And the second seat portion 200 connected to the first seat portion 100 may serve as a seat cushion. When the direction change of the seat 10 is performed, the first seat portion 100, which served as a seatback, serves as a seat cushion and the second seat portion 200, which served as a seat cushion, serves as a seatback. It can be seen from FIGS. 1 and 3 that when it comes to a vehicle seat 10 provided in a vehicle requiring diverse seating conditions, the roles of the seatback and the seat cushion are undistinguished and interchangeable in use, which means that the roles of the first seat portion 100 and the second seat portion 200 may be reversed as the direction change of the seat 10 is performed.

On the other hand, FIG. 2 shows that the seatbelt 600 provided in the vehicle seat 10 of the present disclosure may have a 3-point configuration. That the seatbelt 600 has a 3-point configuration means that there exist three points, namely points A, B, and C, at which the seatbelt 600 is fixed. In the case of an existing seatbelt 600, there exists point A at which the seatbelt 600 is fixed to the vehicle frame. Applying this seatbelt 600 to the vehicle seat 10 capable of the direction change poses a problem that the passenger is not equally protected according to the direction change of the seat. Thus, in the present disclosure, the seatbelt 600 has a 3-point configuration, but the fixing point A at which the seatbelt 600 is fixed is moved from the vehicle frame to the seat 10 to protect the passenger equally according to the direction change of the seat. In particular, to form the fixing point of the seatbelt 600 at the level of the passenger's shoulder similar to the existing 3-point seatbelt 600, the fixing point is formed in the first seat portion 100 or the second seat portion 200, which becomes the seatback. Both the first seat portion 100 and the second seat portion 200 need to serve as a seatback according to the direction change of the seat, and accordingly, the fixing point needs to be formed in both the first seat portion 100 and the second seat portion 200.

In addition, the fixing point of the seatbelt 600 needs to be moved continually according to the direction change of the seat 10 and thus needs to have an attachable and detachable configuration. Therefore, in the present disclosure, the first seat portion 100 and the second seat portion 200 are respectively provided with the first fixing device 110 and the second fixing device 210, and the seatbelt 600 is provided with a coupling device 620 engaging with the first fixing device 110 and the second fixing device 210. The coupling device 620 may move the fixing position of the seatbelt 600 by engaging with the first fixing device 110 or the second fixing device 210. At this time, the first fixing device 110 and the second fixing device 210 may be provided on the rear surfaces of the first seat portion 100 and the second seat portion 200 respectively and may be provided at the ends opposite the position of the rotation shaft 300. The positions of the first fixing device 110 and the second fixing device 210 may vary depending on where the 3-point fixing points of the seatbelt 600 are formed. The first fixing device 110 and the second fixing device 210 may be respectively formed on the surfaces of the first seat portion 100 and the second seat portion 200 where the passenger is seated, but this may cause discomfort depending on the seating condition of the passenger. Therefore, in an embodiment of the present disclosure, the first fixing device 110 and the second fixing device 210 are respectively provided on the rear surfaces of the first seat portion 100 and the second seat portion 200.

The first fixing device 110 and the second fixing device 210 are provided at the ends of the first seat portion 100 and the second seat portion 200 opposite the position where the rotation shaft 300 connecting the first seat portion 100 and the second seat portion 200 is formed. When the seatbelt 600 deploys from above the shoulder line of the passenger and diagonally supports the passenger's body, the safety of the passenger can be sufficiently secured. Therefore, the first fixing device 110 and the second fixing device 210 need to be provided at the ends of the first seat portion 100 and the second seat portion 200 serving as the seatback to form the point A, which is a fixing point of the seatbelt 600, on the side of the shoulder line of the passenger. That is, FIGS. 3A and 3B show that the coupling device 620 provided in the webbing 610 engages with the first fixing device 110 provided on the rear surface of the first seat portion 100 when the vehicle seat 10 faces the front. Then, when the seat 10 faces the rear by the direction change of the seat 10, the coupling device 620 disengages from the first fixing device 110 and engages with the second fixing device 210 provided in the second seat portion 200. As a result, the position of the seatbelt 600 remains the same even when the seat 10 undergoes the direction change.

On the other hand, the vehicle seat 10 of the present disclosure further includes the main buckle tongue 630 provided to be movable along the webbing 610, a main buckle 700 provided on one side of the seat 10 and coupled to the main buckle tongue 630, and a retractor 800 that is provided on the other side of the seat 10 and on which the webbing 610 is wound. The main buckle 700 and the retractor 800 provided in the vehicle seat 10 will be described later, and the first fixing device 110 and the second fixing device 210 provided in the first seat portion 100 and the second seat portion 200 will be described.

The positions of the first fixing device 110 and the second fixing device 210 to be provided on the first seat portion 100 and the second seat portion 200 can be clearly determined by providing the main buckle 700 and the retractor 800 in the vehicle seat 10. In order to build a 3-point seatbelt 600 to protect passengers safely, it is necessary to form the fixing point of the seatbelt 600 in an appropriate position. As described in FIGS. 2 and 3, in this disclosure, it is necessary to form the point B, which is the fixing point by the retractor 800, and the point A, which is the fixing point of the seatbelt 600, on the same side. Therefore, in this disclosure, the first fixing device 110 and the second fixing device 210 may be provided on the rear surfaces of the first seat portion 100 and second seat portion 200, on the side where the retractor 800 is provided and may be provided at the ends opposite the rotation shaft 300.

In the description of the positions of the first fixing device 110 and the second fixing device 210, the first seat portion 100 and the second seat portion 200 have the same configuration, and the first fixing device 110 and the second fixing device 210 also have the same configuration. Therefore, when the direction change of the seat 10 is performed, only the roles performed by the devices 110, 120, 210, 220 included in the first seat portion 100 and the second seat portion 200 change, and their properties or formation positions do not change.

Specifically, FIG. 4 is a perspective view of a first fixing device or a second fixing device formed in the first seat portion or the second seat portion according to an embodiment of the present disclosure. FIGS. 2 and 3 show that the vehicle seat 10 of the present disclosure further includes a first rest portion 400 and a second rest portion 500 respectively provided with fixing bars 410, 510 and respectively connected to the first seat portion 100 and the second seat portion 200 through the fixing bars 410, 510 and connection portions 120, 220 coupled to the fixing bars 410, 510 of the first rest portion and the second rest portion to allow the extension and rotation of the fixing bars 410, 510 are respectively provided on the rear surfaces of the first seat portion 100 and the second seat portions 200. The first rest portion 400 and the second rest portion 500 may respectively serve as a headrest or a leg rest according to the direction change of the vehicle seat 10.

When the first rest portion 400 and the second rest portion 500 serving as a headrest or a leg rest are required in the vehicle seat 10, the connection portions 120, 220 respectively connected to the first rest portion 400 and the second rest portion 500 are provided on the rear surfaces of the first seat portion 100 and the second seat portion 200. The connection portions 120, 220 may exist singly or in multiple. In one embodiment of the present disclosure, the connection portions 120, 220 exist in pairs. In this case, the first fixing device 110 and the second fixing device 210 provided on the rear surfaces of the first seat portion 100 and the second seat portion 200 need to be detached from the connection portions provided on the rear surfaces of the first seat portion 100 and the second seat portion 200.

Therefore, the first fixing device 110 and the second fixing device 210 are respectively provided on the rear surfaces of the first seat portion 100 and the second seat portion 200, but are provided between the side ends of the first seat portion 100 and the second seat portion 200 and the connection portions 120, 220 connected to the first rest portion 400 and the second rest portion 500. It can be seen from FIG. 4 that the first fixing device 110 or the second fixing device 210 is provided on the side of the rear surface of the first seat portion 100 or the second seat portion 200 serving as a seatback. Providing the first fixing device 110 or the second fixing device 210 on the side of the rear surface of the first seat portion 100 or the second seat portion 200 allows avoidance of interference with the connection portions 120, 220 connected to the first rest portion 400 and the second rest portion 500.

FIG. 5 is a perspective view of a coupling device in an engaging state with the first fixing device or a second fixing device according to an embodiment of the present disclosure. The coupling device 620 provided in the webbing 610 of the seatbelt 600 can engage with the first fixing device 110 or the second fixing device 210 in various ways. In one embodiment of the present disclosure, the fixing devices 110, 210 respectively provided in the first seat portion 100 and the second seat portion 200 may be auxiliary buckles, and the coupling device 620 provided in the webbing 610 may be an auxiliary buckle tongue that can be connected to the auxiliary buckle. In order to facilitate the movement of the fixing point of the seatbelt 600 when the direction change of the seat 10 of the present disclosure is performed, disengagement and engagement between the coupling device 620 and the fixing devices 110, 210 should be possible. Therefore, the present disclosure adopts the method of engaging the main buckle 700 and the main buckle tongue 630 of the conventional seatbelt 600 and applies the method to the disengagement and engagement between the coupling device 620 and the fixing devices 110, 210. As a result, the passenger may easily disengage and engage the seatbelt 600 to the direction change of the seat 10.

The webbing 610 passes between the first seat portion 100 and the first rest portion 400 or between the second seat portion 200 and the second rest portion 500, and the coupling device 620 provided in the webbing 610 engages with the first fixing device 110 or the second fixing device 210 provided on the rear surfaces of the first seat portion 100 and the second seat portion 200. FIG. 5 shows that the coupling device 620 forms the seatbelt 600 according to the direction change of the seat 10 through the engagement with the first fixing device 110 or the second fixing device 210.

It is necessary to specify the method of engaging the coupling device 620 and the first fixing device 110 or the second fixing device 210 when the seatbelt 600 is formed to ensure the usability of the seatbelt for the passenger. When the coupling device 620 directly engages with the first fixing device 110 or the second fixing device 210, the seatbelt 600 is formed in the rear direction of the first seat portion 100 or the second seat portion 200 serving as the seatback. Forming the seatbelt 600 in the rear direction of the first seat portion 100 or the second seat portion 200 poses a problem that the accessibility of the seatbelt 600 is reduced when the passenger is seated. Therefore, the present disclosure specifies the method of engaging the coupling device 620 and the first fixing device 110 or the second fixing device 210, thereby having the effect of establishing the position of the seatbelt 600 and increasing the accessibility to the seatbelt 600 for the passenger.

Meanwhile, FIG. 6 is an enlarged perspective view of a side of a vehicle seat provided with a retractor according to an embodiment of the present disclosure, and FIG. 8 is an enlarged perspective view of a side of a vehicle seat provided with a main buckle according to an embodiment of the present disclosure. The webbing 610 of the seatbelt 600 is further provided with the main buckle tongue 630 provided to be movable along the webbing 610, and the main buckle tongue 630 is coupled to the main buckle 700 provided on one side of the seat 10. The retractor 800 on which the webbing 610 is wound is provided on the other side of the seat 10 so that the passenger can freely adjust the seatbelt 600. The seatbelt 600 may form a 3-point seatbelt 600 as shown in FIG. 2 due to the coupling of the main buckle tongue 630 and the main buckle 700, the fixing of the retractor 800, and the fixing position of the seatbelt 600.

The main buckle 700 and the retractor 800 are respectively provided on the side of the seat 10 to allow rotation according to the direction change of the seat 10. FIG. 7 is a plan view showing the rotation of the retractor 800 provided on both sides of the vehicle seat 10 according to an embodiment of the present disclosure, and FIG. 9 is a plan view showing the rotation of the main buckle provided on one side of the vehicle seat according to an embodiment of the present disclosure. A failure to rotate the main buckle 700 and retractor 800 even when the seat 10 undergoes the direction change poses a problem that the seatbelt 600 cannot be provided for the passenger smoothly and the passenger cannot wear the seatbelt 600. In the present disclosure, since the vehicle seat 10 is redirected in the front-to-rear direction of the vehicle, the main buckle 700 and retractor 800 also need to rotate in the front-to-rear direction of the vehicle. Therefore, the retractor 800 and main buckle 700 respectively provided on either side of the vehicle seat 10 are configured to be fixed in position but rotatable around the fixing point as the center of rotation. However, the main buckle 700 and retractor 800 rotate in the same direction according to the direction change of the seat 10. When the vehicle seat 10 faces the front of the vehicle, the main buckle 700 and the retractor 800 also face the front of the vehicle, and when the seat 10 faces the rear, the main buckle 700 and the retractor 800 face the rear of the vehicle. As a result, there is the effect that the passenger may put on the seatbelt 600 smoothly regardless of the direction they are facing, front or rear.

On the other hand, FIGS. 10 and 11 are plan views of a retractor case provided on the side of a vehicle seat according to an embodiment of the present disclosure. The main buckle 700 and the retractor 800 are provided on both sides of the vehicle seat 10. The vehicle seat 10 of the present disclosure may further include a case 900 in which a space where the retractor 800 is housed and the retractor 800 rotates is formed. The retractor 800 winds up webbing 610 and provides additional webbing 610 for the passenger to use the seatbelt 600, so the retractor 800 needs to be protected from exposure to the outside. FIG. 10 shows that the present disclosure provides a case 900 in which the retractor 800 is housed but the retractor needs to be rotatable inside the case. FIGS. 10 and 11 show that the retractor 800 may have a rotation shaft formed by an anchor 910, and movement in directions other than rotation may be restricted. The case 900 may be provided on the side of the seat 10 at the same position as the retractor 800. However, the case 900 needs to be open on the top to provide webbing 610 from the retractor 800.

However, if the top of the case 900 is open, foreign substances may enter the case and the retractor 800 may fail to supply the webbing smoothly. Therefore, a cover 920 is attached to the top of the case 900, and a slit is formed in the cover 920 so that the webbing 610 extending from the retractor 800 is guided along the slit as the retractor 800 rotates. FIG. 10 shows that a webbing guide 930 is provided in the slit of the cover and the webbing guide 930 slides in the slot while the webbing 610 extending from the retractor 800 passes through the webbing guide 930. The webbing 610 extending from the retractor 800 may simply pass through the slit to be provided, but there is a risk of the webbing 610 being crumpled or damaged by the rotation of the retractor 800. Therefore, an additional webbing guide 930 is provided to ensure that the webbing 610 extending from the retractor 800 may be provided to the passenger intact.

In addition, FIG. 6 shows that a storage recess 940 for storing the main buckle tongue 630 is formed in the cover 920. When the main buckle tongue 630 of the seatbelt 600 is detached from the main buckle 700, the main buckle tongue 630 is inserted and stored in the storage recess 940 of the cover 920. The main buckle tongue 630 provided in the webbing 610 of the seatbelt 600 freely moves along the webbing 610 unless a separate device is provided in the webbing 610 to prevent the main buckle tongue 630 from moving. The free movement of the main buckle tongue 630 poses a problem: the passenger will have difficulty finding the main buckle tongue 630 when putting on the seatbelt 600. The freely moving main buckle tongue 630 may cause damage to surrounding devices or injury to the passenger. Therefore, in this disclosure, a storage recess 940 is formed in the cover 920 to store the main buckle tongue 630 that moves freely along the webbing 610. When the passenger disengages the main buckle tongue 630 from the main buckle 700 to get off the vehicle or to perform the direction change of the seat the passenger inserts the main buckle tongue 630 into the storage recess 940 of the cover 920. As a result, the passenger may locate the main buckle tongue 630 when putting on the seatbelt 600 after the direction change of the seat 10.

According to the vehicle seat of the present disclosure, by positioning the seatbelt so that the passenger may be restrained from both directions of the seat according to the direction change of the seat around the rotation shaft, there is an effect of securing the same restraining force and safety even when the direction of the seat and the seating condition of the passenger change.

While only specific embodiments of the present disclosure have been described herein, it will be apparent to those skilled in the art that the present disclosure may be variously improved upon and modified within the scope of not departing from the technical spirit of the present disclosure provided by the following claims.

What is claimed is:
1. A vehicle seat comprising:
a first seat portion serving as a seatback or a seat cushion depending on a rotational position of the first seat portion;
a second seat portion connected to the first seat portion and serving as a seatback or a seat cushion depending on a rotational position of the second seat portion;
a rotation shaft allowing a direction change of the seat when the first seat portion and the second seat portion rotate by connecting the first seat portion and the second seat portion and providing a rotation center for the first seat portion and the second seat portion;
a first fixing device and a second fixing device respectively provided in the first seat portion and the second seat portion; and
a seatbelt including a webbing and a coupling device connected to the webbing and allowing a passenger to be restrained from front and rear directions of the seat by engaging the coupling device with the first fixing device or the second fixing device according to the direction change of the seat.
2. The vehicle seat of claim 1, wherein the first fixing device and the second fixing device are respectively provided on rear surfaces of the first seat portion and the second seat portion and further provided at ends of the first seat and second seat portions opposite to a position of the rotation shaft.

3. The vehicle seat of claim 1, further comprising:
a main buckle tongue provided to be movable along the webbing;
a main buckle provided on one side of the seat and coupled to the main buckle tongue; and
a retractor provided on another side of the seat,
wherein the webbing is wound on the retractor.

4. The vehicle seat of claim 3, wherein the main buckle and the retractor are respectively rotatable according to the direction change of the seat.

5. The vehicle seat of claim 3, wherein the first fixing device and the second fixing device are respectively provided on rear surfaces of the first seat portion and the second seat portion and further provided at ends of the first seat and second seat portions opposite to a position of the rotation shaft.

6. The vehicle seat of claim 1, further comprising a first rest portion and a second rest portion respectively provided with fixing bars and respectively connected to the first seat portion and the second seat portion through the fixing bars, wherein a connection portion coupled to the fixing bars of the first rest portion and the second rest portion to allow extension and rotation of the fixing bars are respectively provided on rear surfaces of the first seat portion and the second seat portion.

7. The vehicle seat of claim 6, wherein the first rest portion and the second rest portion respectively serve as a headrest or a leg rest according to the direction change of the seat.

8. The vehicle seat of claim 6, wherein the first fixing device and the second fixing device are provided on the rear surfaces of the first seat portion and the second seat portion respectively, and are provided between side ends of the first seat portion and the second seat portion and the connection portion connected to the first rest portion and the second rest portion.

9. The vehicle seat of claim 6, wherein the webbing passes between the first seat portion and the first rest portion or between the second seat portion and the second rest portion, and the coupling device provided in the webbing engages with the first fixing device or the second fixing device provided on the rear surfaces of the first seat portion and the second seat portion.

10. The vehicle seat of claim 1, wherein the first and second fixing devices provided in the first seat portion and the second seat portion respectively are auxiliary buckles.

11. The seat vehicle of claim 10, wherein the coupling device connected to the webbing is an auxiliary buckle tongue engageable with the auxiliary buckle.

12. The vehicle seat of claim 3, further comprising a case in which the retractor is housed and a space for the retractor rotation is formed.

13. The vehicle seat of claim 12, wherein a cover is coupled to a top of the case, and a slit is formed in the cover so that the webbing extending from the retractor is guided along the slit when the retractor rotates.

14. The vehicle seat of claim 13, wherein the slit of the cover is provided with a webbing guide, the webbing guide slides in the slit, and the webbing extending from the retractor passes through the webbing guide.

15. The vehicle seat of claim 13, wherein a storage recess for storing the main buckle tongue is formed in the cover.

16. The vehicle seat of claim 15, wherein the main buckle tongue is inserted and stored in the storage recess of the cover when the main buckle tongue of the seatbelt is detached from the main buckle.

* * * * *